US012083707B2

(12) United States Patent
Nakagawa et al.

(10) Patent No.: US 12,083,707 B2
(45) Date of Patent: Sep. 10, 2024

(54) METHOD FOR PRODUCING A REINFORCING BAR

(71) Applicant: NAKAGAWA SANGYO Co., Ltd., Inuyama (JP)

(72) Inventors: Hiroshige Nakagawa, Inuyama (JP); Noriaki Nakagawa, Inuyama (JP)

(73) Assignee: NAKAGAWA SANGYO CO., LTD., Inuyama (JP)

( * ) Notice: Subject to any disclaimer, the term of this patent is extended or adjusted under 35 U.S.C. 154(b) by 304 days.

(21) Appl. No.: 17/649,132

(22) Filed: Jan. 27, 2022

(65) Prior Publication Data
US 2022/0234254 A1     Jul. 28, 2022

(30) Foreign Application Priority Data

Jan. 27, 2021  (JP) .................................. 2021-11467
Dec. 21, 2021  (JP) ................................ 2021-206703

(51) Int. Cl.
*B29B 15/12*       (2006.01)
*B29B 15/14*       (2006.01)
(Continued)

(52) U.S. Cl.
CPC ............ *B29B 15/122* (2013.01); *B29B 15/14* (2013.01); *B29C 70/52* (2013.01); *B29C 70/20* (2013.01);
(Continued)

(58) Field of Classification Search
CPC ............ B29D 99/0046; B29L 2031/06; B29B 15/122–125; B29B 15/14; B29C 70/20; B29C 70/52–524; B29K 2101/12
See application file for complete search history.

(56) References Cited

U.S. PATENT DOCUMENTS 4,569,471 A    2/1986  Ingemansson et al.
4,728,387 A *  3/1988  Hilakos .................. D07B 7/145
                                                     156/551

(Continued)

FOREIGN PATENT DOCUMENTS

EP    0170499 A2    2/1986
EP    0303499 A1    2/1989
(Continued)

OTHER PUBLICATIONS

Translation of JP2012251378 (Year: 2012).*

(Continued)

*Primary Examiner* — Matthew P Travers
(74) *Attorney, Agent, or Firm* — J-TEK LAW PLLC; Jeffrey D. Tekanic; Scott T. Wakeman

(57) ABSTRACT

A method of producing a reinforcing bar (Sc) involves impregnating and integrating reinforcing fibers (Fb) with a thermoplastic polymer. The method may include: immersing and passing the reinforcing fibers (Fb), initially in a non-flat bundle form, through a storage tank (2) containing the thermoplastic polymer in a liquid form; flattening the reinforcing fibers (Fb), while being passed (moving) through the storage tank (2) and immersed in the liquid thermoplastic polymer, into a flatter state to cause the liquid thermoplastic polymer to better infiltrate and coat the reinforcing fibers (Fb); and then convergently shaping the flat reinforcing fibers (Fb) infiltrated with the liquid thermoplastic polymer into a non-flat bundle form again while the reinforcing fibers are still immersed in the liquid thermoplastic polymer.

16 Claims, 10 Drawing Sheets

(51) Int. Cl.
  *B29C 70/20* (2006.01)
  *B29C 70/52* (2006.01)
  *B29D 99/00* (2010.01)
  *B29K 101/12* (2006.01)
(52) U.S. Cl.
  CPC ...... *B29D 99/0046* (2013.01); *B29K 2101/12* (2013.01)

(56) References Cited

U.S. PATENT DOCUMENTS

| | | | |
|---|---|---|---|
| 4,770,832 A | | 9/1988 | Okamoto et al. |
| 4,864,964 A | * | 9/1989 | Hilakos ................. B29B 15/122 425/93 |
| 5,026,447 A | * | 6/1991 | O'Connor ............... B29C 70/52 264/296 |
| 5,133,282 A | * | 7/1992 | Bates .................... B29B 15/125 156/441 |
| 5,206,085 A | | 4/1993 | Nakagawa et al. |
| 5,268,050 A | | 12/1993 | Azari |
| 5,529,652 A | * | 6/1996 | Asai ..................... B29C 48/156 425/114 |
| 5,540,797 A | | 7/1996 | Wilson |
| 5,788,908 A | * | 8/1998 | Murakami ............ B29B 15/122 156/166 |
| 5,879,602 A | | 3/1999 | Scheuring |
| 5,989,376 A | | 11/1999 | Kusy et al. |
| 6,007,655 A | | 12/1999 | Gorthala et al. |
| 6,270,851 B1 | | 8/2001 | Lee et al. |
| 9,068,284 B2 | * | 6/2015 | Jung ..................... D03D 15/46 |
| 2015/0284886 A1 | | 10/2015 | Ohtani et al. |
| 2022/0072814 A1 | | 3/2022 | Nakagawa et al. |
| 2022/0161479 A1 | | 5/2022 | Nakagawa et al. |
| 2022/0203634 A1 | | 6/2022 | Nakagawa et al. |
| 2022/0282649 A1 | | 9/2022 | Nakagawa et al. |

FOREIGN PATENT DOCUMENTS

| | | |
|---|---|---|
| JP | S53159115 U | 12/1978 |
| JP | S58132514 A | 8/1983 |
| JP | S6135232 A | 2/1986 |
| JP | S6445832 A | 2/1989 |
| JP | H0480451 A | 3/1992 |
| JP | H04278311 A | 10/1992 |
| JP | H07252372 A | 10/1995 |
| JP | 2000254978 A | 9/2000 |
| JP | 2002054270 A | 2/2002 |
| JP | 2008266648 A | 11/2008 |
| JP | 2009090474 A | 4/2009 |
| JP | 2011167804 A | 9/2011 |
| JP | 2012251378 A | 12/2012 |
| JP | 2018030318 A | 3/2018 |
| JP | 2018123180 A | 8/2018 |
| JP | 2020111989 A | 7/2020 |
| WO | 2014061384 A1 | 4/2014 |
| WO | 2017043654 A1 | 3/2017 |
| WO | 2020060506 A1 | 3/2020 |

OTHER PUBLICATIONS

Translation of JP2020111989 (Year: 2020).*
Office Action from the Japanese Patent Office dispatched Jan. 18, 2022 in related Japanese application No. 2021-205638, and machine translation thereof.
Office Action from the Japanese Patent Office drafted on Nov. 1, 2021, in related JP application No. 2021-142043, and machine translation thereof.
Office Action from the Japanese Patent Office drafted on Dec. 2, 2021, in related JP application No. 2021-187527, and machine translation thereof.
Office Action from the Japanese Patent Office drafted on Jan. 12, 2022, in related JP application No. 2021-187527, and machine translation thereof.
Office Action from the Japanese Patent Office drafted on Jan. 28, 2022, in related JP application No. 2021-206703, and machine translation thereof.
Office Action from the Japanese Patent Office drafted on May 25, 2022, in related JP application No. 2021-206703, and machine translation thereof.
Unpublished U.S. Appl. No. 17/464,996.
Unpublished U.S. Appl. No. 17/530,519.
Unpublished U.S. Appl. No. 17/645,651.
Office Action mailed Feb. 28, 2023, in related U.S. Appl. No. 17/645,651, and examined claims 1-20.
Office Action mailed Sep. 26, 2023, in related U.S. Appl. No. 17/530,519, and examined claims 1-19.

* cited by examiner

METHOD FOR PRODUCING A REINFORCING BAR

CROSS-REFERENCE TO RELATED APPLICATIONS

The present application claims priority to Japanese patent application No. 2021-11467 filed on Jan. 27, 2021, and to Japanese patent application No. 2021-206703 filed on Dec. 21, 2021, the contents of both of which are hereby fully incorporated herein by reference.

BACKGROUND OF THE INVENTION

Technical Field

The present invention generally relates to a method for producing a reinforcing bar that may be suitably used for reinforcement of concrete and the like.

Related Art

Basalt fiber has been used in such a reinforcing bar ("rebar"), because basalt fiber does not rust and it enables the tensile strength of concrete to be maintained for an extended period of time. Therefore, such reinforcing bars have been gaining attention as a replacement for conventional reinforcing bars made of iron. As disclosed in Japanese Patent Laid-Open Publication No. 2012-251378, for example, a reinforcing bar having a structure obtained by covering the circumference of a core material, which is a bundle of basalt fibers, with a thermoplastic polymer (resin) layer having a predetermined thickness has been proposed. As a conventional method for forming the polymer (resin) layer around the core material, a resin immersion or impregnation method has been widely used in which the core material is immersed in a bath of molten polymer (resin solution), such as is disclosed in the above-noted Japanese Patent Laid-Open Publication No. 2012-251378.

SUMMARY

However, the above-described known resin immersion method suffers from the problem that it is not capable of producing a reinforcing bar having sufficient strength because the basalt fibers, which is the reinforcing fiber material, are insufficiently impregnated with the thermoplastic resin (polymer) material.

It is therefore one, non-limiting object of the present teachings to disclose techniques for improving a method for producing a reinforcing bar, whereby a reinforcing fiber material is sufficiently infiltrated (impregnated) and integrated with a thermoplastic polymer (resin) material to produce a high strength reinforcing bar.

In a first aspect of the present teachings, a method of producing a reinforcing bar (Sc), in which a reinforcing fiber material (Fb) is impregnated (coated) and integrated with a thermoplastic polymer (resin) material, may optionally comprise: passing the reinforcing fiber material (Fb) in a non-flat bundle form through a storage tank (2) storing (containing) the thermoplastic resin (polymer) material in a liquid form (e.g., molten thermoplastic resin (polymer) material); flattening the reinforcing fiber material (Fb), which was in the non-flat bundle form while (initially) being passed through the storage tank (2), into a flat (flattened, flatter) state while immersed in the liquid thermoplastic polymer to cause the thermoplastic resin to further infiltrate (impregnate, coat) the reinforcing fiber material (Fb); and, preferably while still immersed in the liquid thermoplastic polymer, convergently shaping the flat reinforcing fiber material (Fb) infiltrated (impregnated, coated) with the thermoplastic resin material into a non-flat bundle form again.

In the first aspect of the present teachings, the reinforcing fiber material in the bundle form is flattened into a flat (or flatter) state while immersed in the liquid thermoplastic resin in the storage tank, whereby the thermoplastic resin material sufficiently infiltrates (impregnates, coats) the reinforcing fiber material, resulting in sufficient strength of the reinforcing bar obtained by convergently shaping the reinforcing fiber material into the non-flat bundle form again.

In a second aspect of the present teachings, the reinforcing fiber material (Fb) is flattened into the flat (or flatter) state by laterally installing a plurality of rod bodies (rods) (21 to 23) in the storage tank (2) and suspending and passing the reinforcing fiber material (Fb) in the bundle form between the rod bodies (21 to 23) in a pressure-contact state (under tension), thereby causing the reinforcing material (Fb) to press firmly against the rod bodies (21 to 23) and flatten (spread) out.

In the second aspect of the present teachings, the reinforcing fiber material in the bundle form can be flattened into the flat (or flatter) state by employing a simple configuration in the storage tank.

In a third aspect of the present teachings, an outer periphery of the reinforcing fiber material (St), after having been convergently shaped, is covered by an additional thermoplastic resin material with a predetermined squeezing force. The additional thermoplastic resin material may be the same composition as, or a different composition from, the liquid (e.g., molten) thermoplastic resin contained in the storage tank.

In the third aspect of the present teachings, covering the outer periphery of the reinforcing fiber material with the additional thermoplastic resin material provides an advantageous outer surface texture and superior chemical resistance for the end product (e.g., a reinforcing bar). In addition or in the alternative, covering the outer periphery of the reinforcing fiber material by applying the predetermined squeezing force significantly increases the strength of the reinforcing fiber material and the resulting reinforcing bar.

In a fourth aspect of the present teachings, the outer periphery of the reinforcing fiber material (Fb), after having been convergently shaped, is covered by wrapping it with a (solid) film material (Lh), which has a predetermined width (and optionally predetermined thickness) and is made of the additional thermoplastic resin (polymer) material, while applying the predetermined squeezing force to the film material (Lh).

In the fourth aspect of the present teachings, wrapping the convergently-shaped reinforcing fiber material with a film material while applying the predetermined squeezing force enables the entire transverse cross section of the reinforcing fiber material (which was previously impregnated (coated) with the liquid thermoplastic (polymer) resin) to be circular or nearly circular, thereby improving appearance of the end product. In addition or in the alternative, wrapping with the film material while applying the predetermined squeezing force significantly increases the strength of the resin-impregnated reinforcing fiber material and the resulting reinforcing bar.

In a fifth aspect of the present teachings, prior to covering with the additional thermoplastic resin material, an elongated body (4), which has a higher tensile strength than the reinforcing fiber material, is placed (disposed) to extend in a longitudinal direction of the reinforcing fiber material (St) and is then integrally fused to (along) at least one portion of the outer periphery of the convergently-shaped reinforcing fiber material (St). A thread-like body, such as a thread, string or rope, may be employed as the elongated body (4).

In the fifth aspect of the present teachings, the tensile strength of the convergently-shaped reinforcing fiber material, and thus the resulting reinforcing bar, can be significantly increased.

In a sixth aspect of the present teachings, a coupling tool (joining fixture, connecting fixture, connector) is fused to an end portion of the reinforcing fiber material (St) that was previously covered with the additional thermoplastic resin material.

In the sixth aspect of the present teachings, reinforcing fiber materials of a certain length may be joined (connected) to each other to obtain a reinforcing bar having a predetermined length.

The above numerals in parentheses indicate, for reference and explanatory purposes only, representative, non-limiting correspondence relationships with specific structures described in the below-described embodiment of the present teachings. Such reference numbers are not intended to restrict or limit the scope of the present teachings in any manner.

As described in the foregoing, according to the method of the present teachings, a reinforcing bar having sufficient strength can be obtained because the reinforcing fiber material is sufficiently (thoroughly) impregnated and integrated with the thermoplastic resin material.

DETAILED DESCRIPTION OF THE PREFERRED EMBODIMENTS

It is noted that the representative exemplary embodiments described below are merely examples of the present teachings, and various design improvements, which may made by one of ordinary skill in the art without departing from the spirit of the present invention, are also encompassed in the scope of the present invention.

Figure 1:
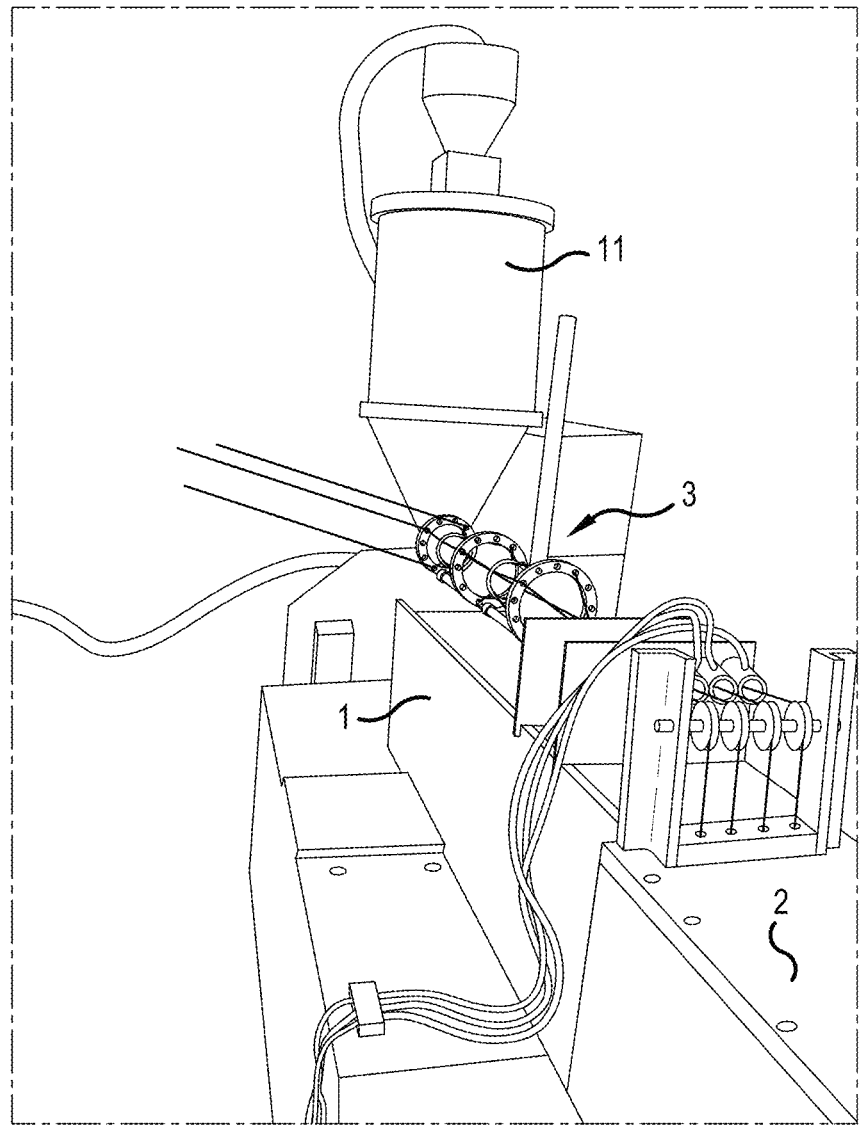
FIG. 1 is a partial perspective view of a manufacturing device for carrying out a method according to the present teachings.

A first exemplary embodiment of a manufacturing device for carrying out a method according to the present teachings is described below. FIG. 1 shows an upstream side of the manufacturing device provided with an extruder 1 having a well-known structure. More specifically, the extruder 1 includes a hopper 11 for feeding (solid) polypropylene (PP) as the thermoplastic resin material, and a storage tank 2 for storing molten PP that was output from the extruder 1. The storage tank 2 is joined (fluidly connected) to an outlet of the extruder 1.

Figure 2:
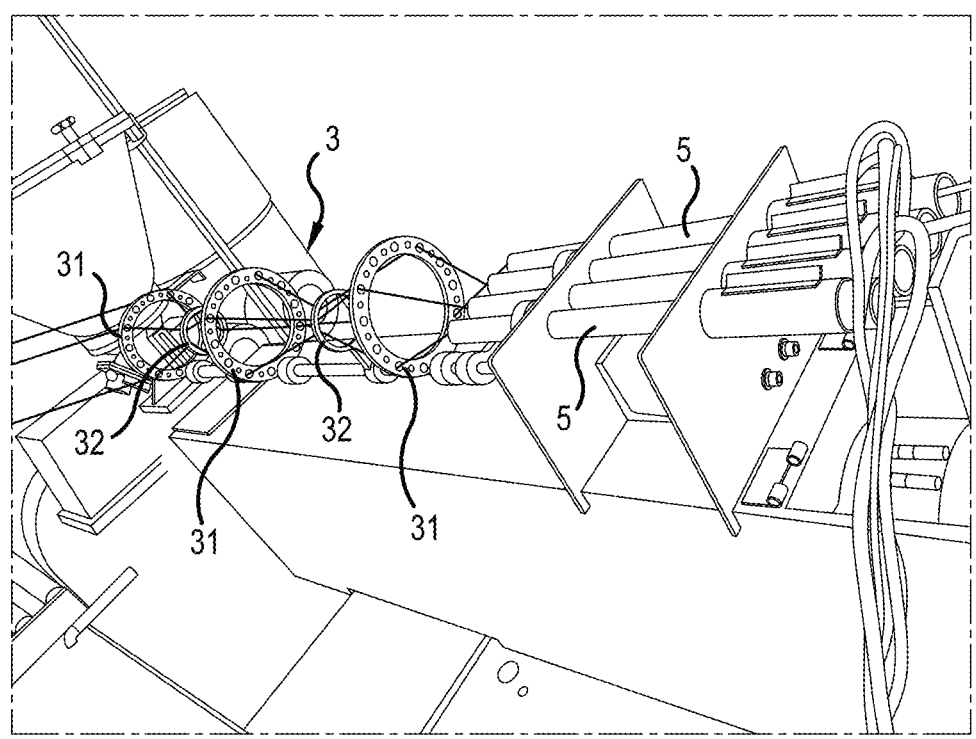
FIG. 2 is a partial enlarged view of the manufacturing device.

In the present embodiment, basalt fibers serve as the reinforcing fiber material and are drawn from each of four bobbins (illustration omitted) as a non-flat roving having a substantially circular shape in transverse cross-section. Each roving is obtained by bundling 4,000 strands of basalt fibers, wherein each basalt fiber has a diameter of about 17 μm. The four rovings of basalt fibers thus drawn are fed into an alignment tool 3 provided on an upper surface of a housing of the extruder 1. As shown in FIG. 2, the alignment tool 3 includes large-diameter rings 31 and small-diameter rings 32 arranged in an alternating manner. The four basalt fiber rovings are respectively passed through four outer peripheral holes of the large-diameter rings 31 and then collectively all of the rovings are passed through the central hole of the small-diameter rings 32 of the alignment tool 3 in an alternating manner, in order to linearly align the rovings.

Figure 3:
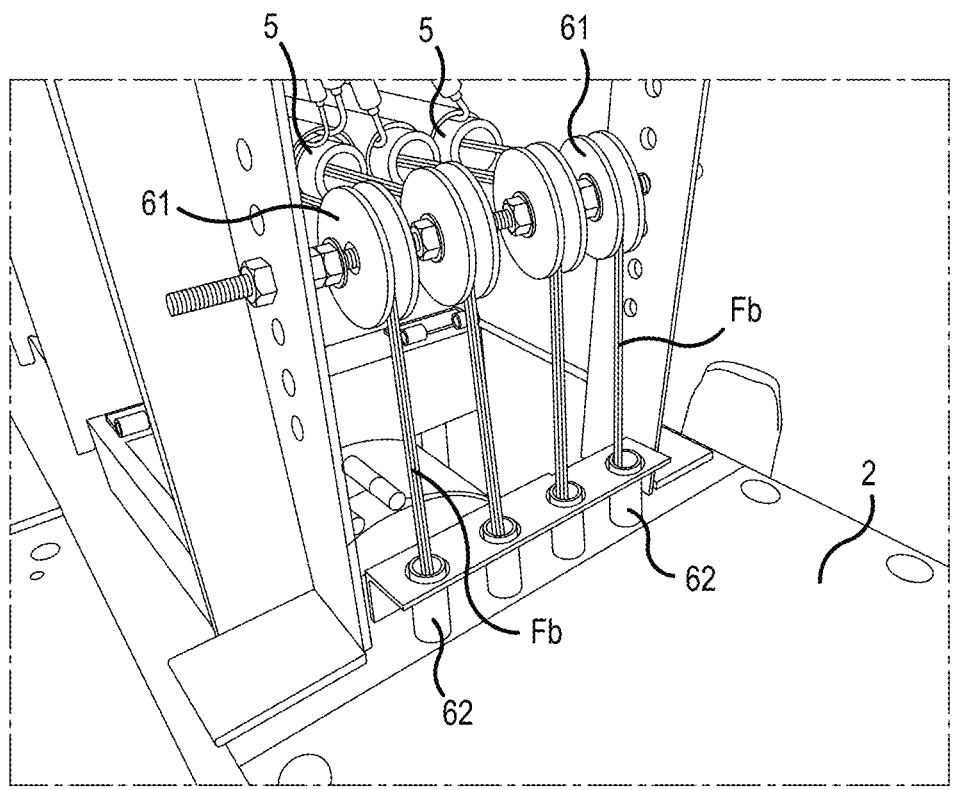
FIG. 3 is an enlarged view of one portion of the manufacturing device.

The basalt fiber rovings thus aligned are respectively passed through four tubular heaters 5 arranged (extending) in a horizontal plane, and heated to a temperature that is at least approximately the same temperature as the molten PP stored (contained) in the storage tank 2 in the subsequent stage. As shown in FIG. 3, the heated basalt fibers Fb are reoriented from the horizontal direction to the downward direction by pulleys 61, and are fed into the storage tank 2 on a lower side via heat-insulating tubular guides 62. By thus feeding the heated basalt fibers into the storage tank 2, it prevents a potential problem of the PP resin prematurely hardening (solidifying) around cold basalt fibers, which could impede a thorough impregnation (coating) of the basalt fibers with molten PP.

Figure 4:
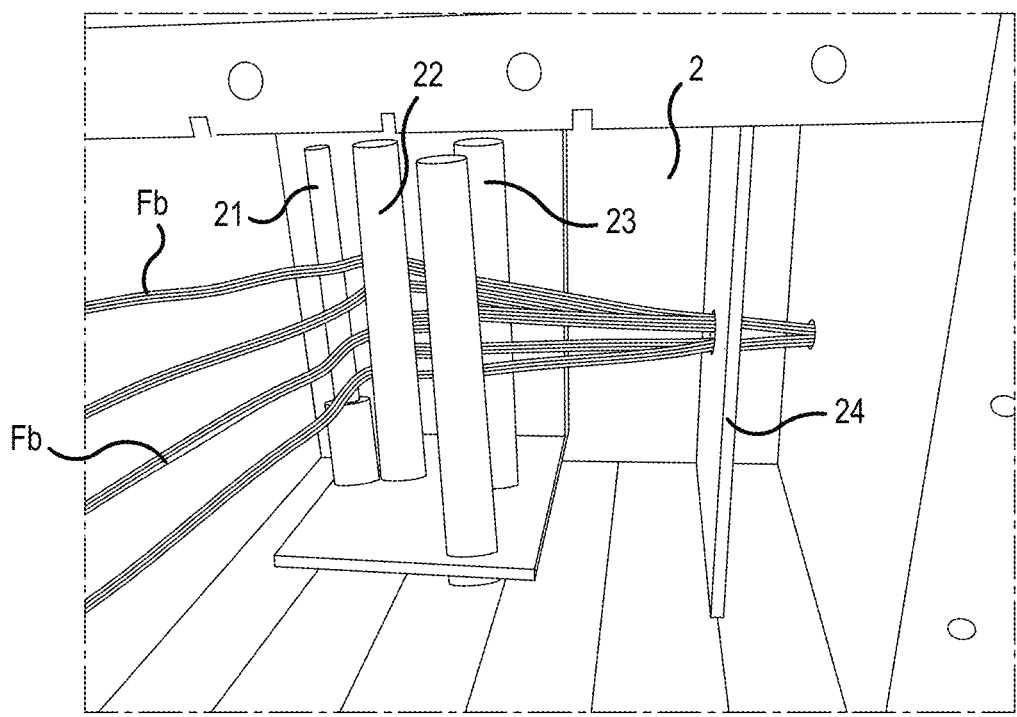
FIG. 4 is a perspective top view of the interior of a storage tank while it does not contain a molten polymer (resin)
Figure 5:
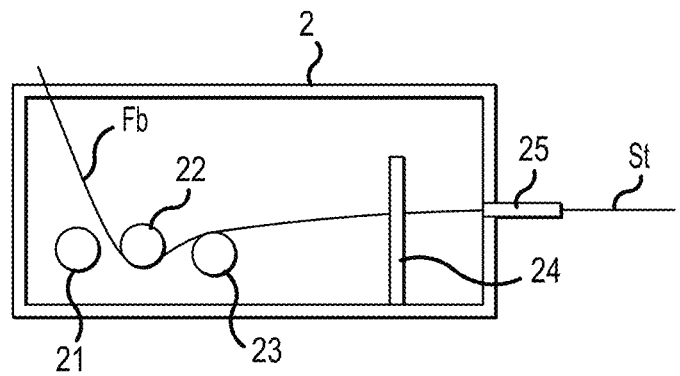
FIG. 5 is a schematic cross-sectional view of the storage tank.

As shown in FIG. 4, three round rods (rod bodies) 21, 22 and 23 serve as pressure-contact members (rod 21 is idle (not utilized) in the present embodiment) and are laterally installed at substantially equal intervals in a substantially horizontal direction inside the liquid molten PP stored in the storage tank 2. In this embodiment, as shown in FIG. 5, the basalt fibers Fb being fed are suspended by, among the three round rods 21 to 23, the central round rod 22 and the round rod 23 positioned on the downstream side thereof, and are then pulled in the downstream direction. While being suspended by the round rods 22, 23 and pulled under tension across the surfaces of the round rods 22, 23, the basalt fibers Fb (which are initially in a substantially circular, non-flat bundle form) are caused to spread or flattened out into an at least substantially flat state (shape) owing to pressure contact with the peripheral surfaces of the round rods 22, 23 (see FIG. 4). As a result of this flattening of the basalt fibers in each roving, the molten PP resin can infiltrate (impregnate, coat) more efficiently and thoroughly (comprehensively) between the strands of the basalt fibers Fb that were spread out into the flat (or flatter) state.

After the basalt fibers Fb have been sufficiently infiltrated (impregnated, coated) with the molten PP resin in this manner, all of the basalt fibers 4B are collectively passed through a central hole of a guide plate 24 (FIG. 4) provided on the downstream side of the round rod 23, thereby converging all of the basalt fibers Fb inwardly towards each other and converging the basalt fibers Fb into a non-flat form, preferably into a substantially circular form. Thereafter, the converged basalt fibers Fb are passed through a through hole of a tubular mold 25 (see FIG. 5) located at the outlet of the storage tank 2, and thus may be shaped into an irregular-shaped, non-flat primary bar St (which may be nearly circular in transverse cross-section). The tubular mold 25 may be a hollow circular cylinder or another similar shape.

Figure 6:
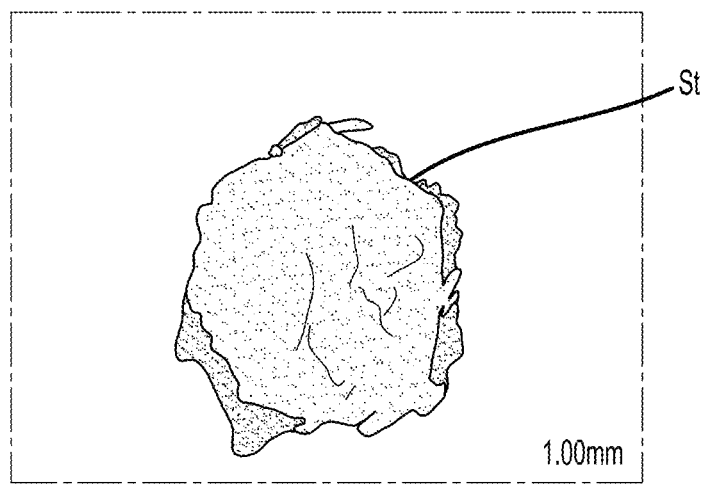
FIG. 6 is a cross-sectional view of a primary bar.

An example of a transverse cross-sectional shape of the primary bar St is shown in FIG. 6. In the primary bar St, even though the PP resin has effectively and thoroughly infiltrated (impregnated, coated) between the strands of the basalt fibers, hair-like projections of the basalt fiber are generated on the outer periphery of the primary bar St, thereby resulting in unfavorable surface texture and a concern that the reinforcing bar could be prone to premature deterioration caused by a chemical reaction (corrosion) when used for reinforcement of concrete.

Figure 7:
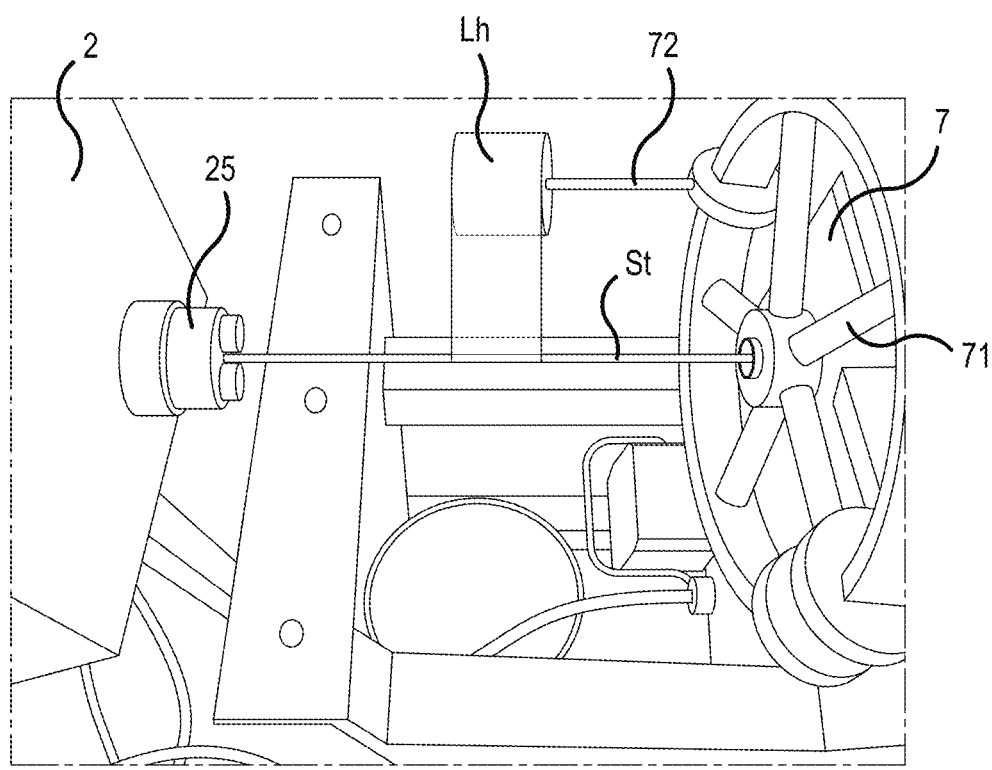
FIG. 7 is a perspective view of a film wrapping machine.
Figure 8:
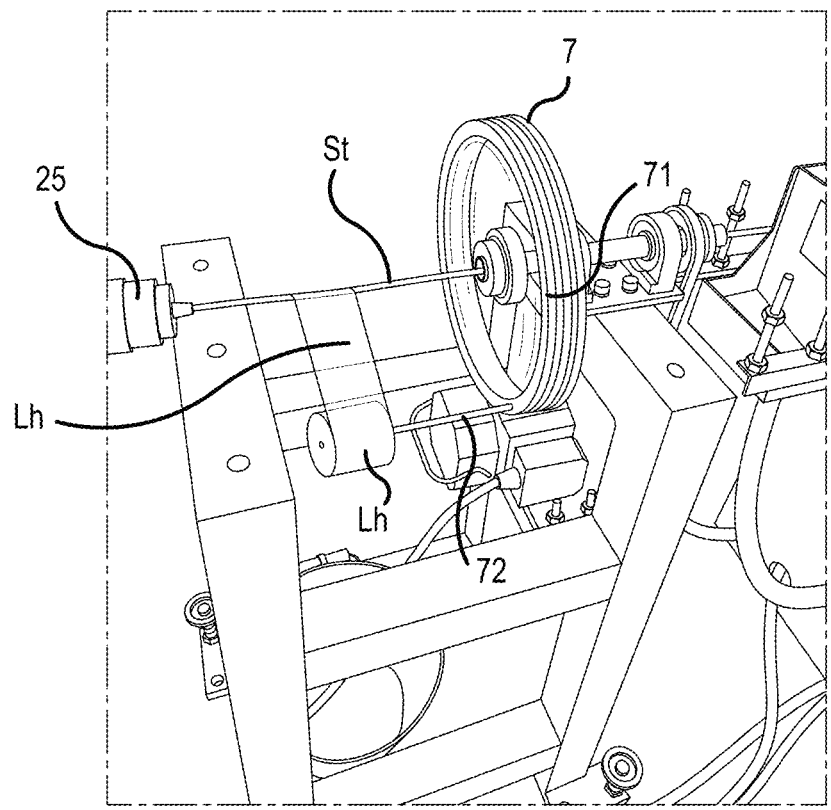
FIG. 8 is a perspective view of the film wrapping machine in operation.

To avoid or at least reduce the likelihood of such potential problems, a solid film Lh of a thermoplastic resin (PP in this embodiment) having a predetermined width and serving as another (an additional) thermoplastic resin is wrapped around the outer periphery of the primary bar St that was pulled from the mold and is moving to the downstream side, by using a film wrapping machine 7 as shown in FIG. 7. The film wrapping machine 7 includes a holding arm 72 that extends horizontally and projects in a cantilever manner from an outer periphery of a rotary body 71. The holding arm 72 holds a roll of the PP film Lh having the predetermined width. As shown in FIG. 8, by rotating the rotary body 71 with an end of the PP film Lh being fixed to the primary bar St, the PP film Lh is helically wrapped with a predetermined overlap on the outer periphery of the primary bar St, and with a predetermined squeezing (radially inward acting) force. An example of the thickness of the PP film Lh is 40 μm. However, the film Lh may have a thickness, e.g., of 20 μm to 100 μm. An example of the width of the PP film Lh is preferably 2.5-20 cm.

Figure 9:
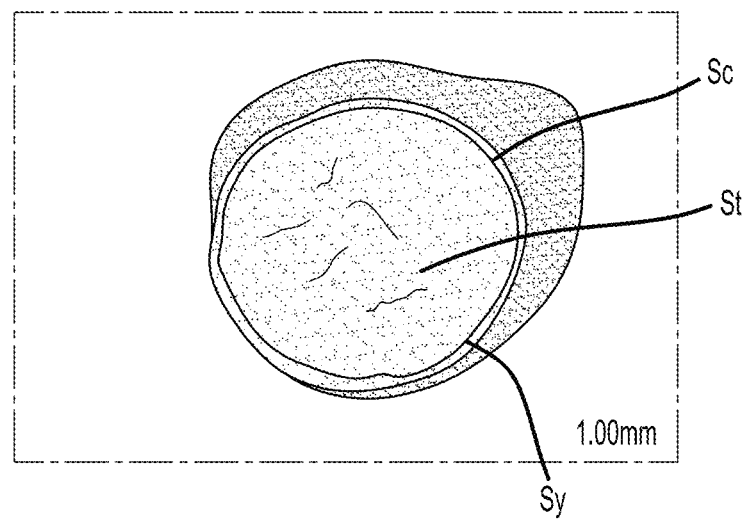
FIG. 9 is a cross-sectional view of a reinforcing bar according to the present teachings.

The PP film Lh thus wrapped adheres to the outer periphery of the primary bar St owing to the fact that an inner peripheral portion of the film Lh is melted by the heat of the primary bar St, which has just exited the tubular mold 25. As a result, the film Lh fuses with the molten PP that was applied to the basalt fibers in the storage tank 2 to form a coating layer having a smooth outer surface covering the hair-like projections and squeezing the entire periphery of the primary bar St. A reinforcing bar Sc as an end product is thus obtained, in which the entire transverse cross section becomes circular or nearly circular. An example of a cross section of a reinforcing bar Sc is shown in FIG. 9, in which Sy is the covering (coating) layer formed from the PP film Lh.

The reinforcing bar Sc is cooled by passing it through a cooling device (e.g., a water tank containing cooling water), and then pinched by a pair of pulling belts (caterpillar tracks) and pulled out of the manufacturing apparatus, according to well-known pultrusion techniques. In a reinforcing bar Sc produced by the above-described method, the PP has sufficiently infiltrated (impregnated, coated) between the strands of the basalt fibers Fb, and the covering layer of the PP film Lh squeezes the entire periphery of the reinforcing bar Sc, whereby sufficient strength is achieved. Furthermore, the covering layer Sy provides a favorable outer texture, superior chemical resistance, and a favorable appearance due to the near-circular cross section.

Figure 10:
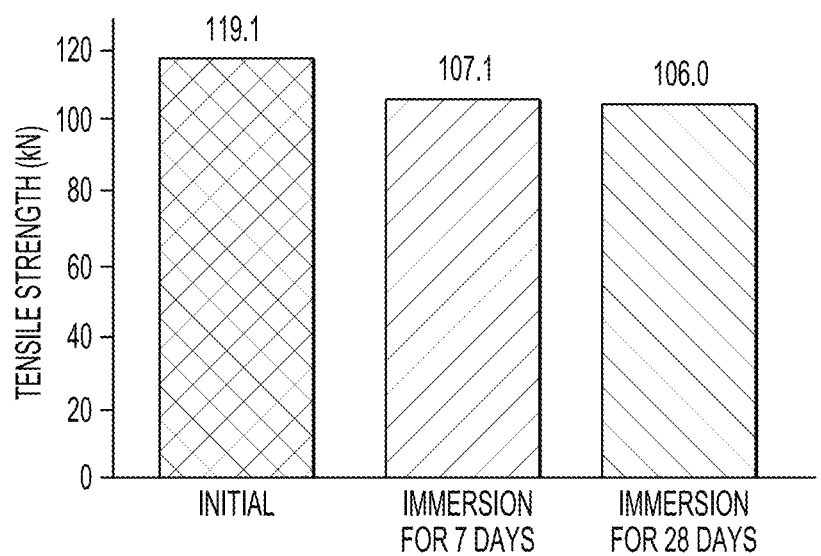
FIG. 10 is a bar graph showing alkali-resistance of a reinforcing bar according to the present teachings.

In a case of obtaining a large-diameter reinforcing bar of 13 mm in diameter by bundling 30 reinforcing bars produced by the above-described procedure, an example of obtained tensile strength measured according to JIS A1192 is no less than 125 kN. In comparison, a tensile strength of about 90 kN was obtained by a reinforcing bar of the same diameter and the same structure as above that was produced by the known immersion method described in the background section above. Thus, the tensile strength of a reinforcing bar according to the present teaching is 1.4 times greater than the tensile strength of a reinforcing bar produced according to the known immersion method. In addition, it is noted that alkali resistance is important when a reinforcing bar is used for reinforcing concrete. In this regard, it is noted that, after immersing 30 reinforcing bars Sc, which were bundled together (and exhibited a tensile strength of about 130 kN and a tensile stress of about 2240 MPa), in an alkali solution having a pH of 12-13 (which is typical for concrete) for 7 days and 28 days, the tensile strength slightly reduced from an initial value of 119.1 kN to 107.1 kN and 106.0 kN, respectively, but remained above 100 kN as shown by the results in FIG. 10.

Figure 11:
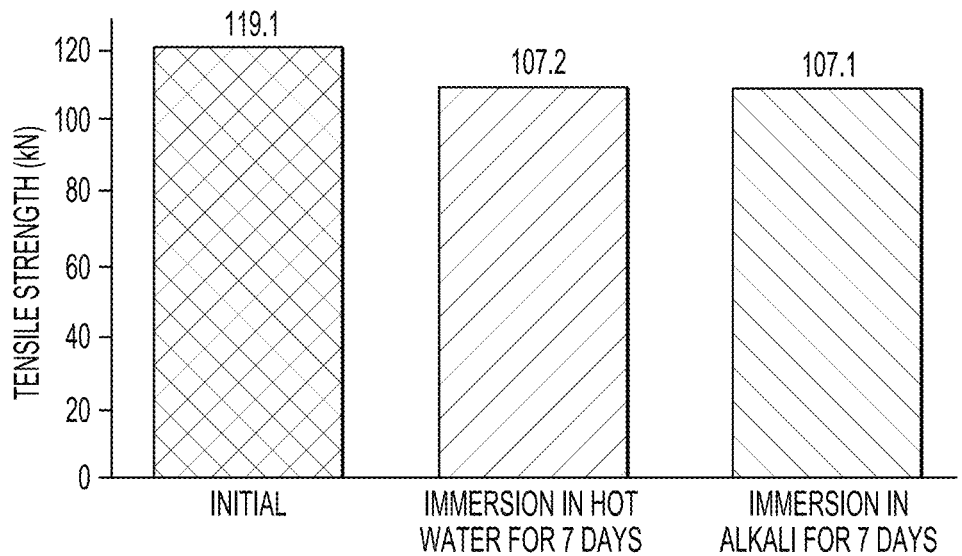
FIG. 11 is a bar graph showing warm water-resistance of a reinforcing bar according to the present teachings.
Figure 12:
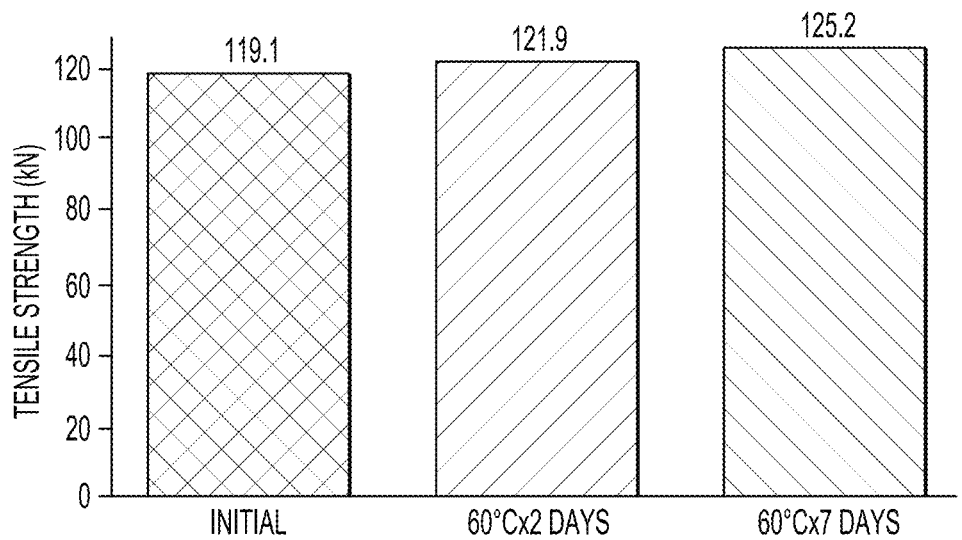
FIG. 12 is a bar graph showing changes in the tensile strength of a reinforcing bar according to the present teachings after being exposed to warm air for 2 days and 7 days.

Furthermore, it is noted that a reduction in strength was approximately equal in both cases of immersion for 7 days in an alkali solution and immersion for 7 days in hot water at 60° C. as shown in FIG. 11. Therefore, the reduction in tensile strength is believed to be influenced primarily by water (moisture), not alkali. In this regard, changes in tensile strength were measured in air at 60° C., instead of hot water, and the tensile strength actually increased with the passage of time as shown in FIG. 12. Since the reinforcing bar Sc reduced in weight during this period, the tensile strength is considered to increase when moisture is lost (evaporates) and an absolute dry state is attained. It is therefore indicated that the tensile strength of the reinforcing bar Sc slightly decreases temporarily when moisture is contained, but the tensile strength is restored as the reinforcing bar Sc dries out.

OTHER EMBODIMENTS

Figure 13:
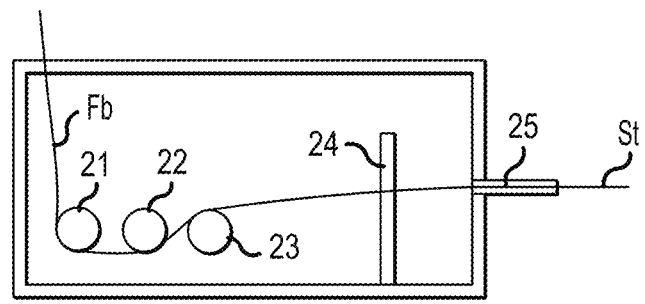
FIG. 13 is schematic cross-sectional view of the storage tank according to another embodiment.

As shown in FIG. 13, by bringing the basalt fibers into pressure (tensioned) contact with two round rods 21, 22 positioned on the upstream side in the storage tank 2, the basalt fibers may be more effectively flattened into a flat (or flatter) state. However, it is noted that pressure-contact members are neither necessarily required to be configured as round rods, and nor required to be rods. For example, the transverse cross-section of pressure-contact members could be, e.g., oval shaped or polygonal shaped, such as trapezoidal or hexagonal shaped, or a mixture of curved and flat shapes, such as semi-circular shaped.

Other methods for forming the covering layer on the outer periphery of the primary bar may be used with the present teachings, in addition or in the alternative to the above-described method of wrapping the PP resin film. For example and without limitation, extruded PP resin may be used to form the covering layer in a tubular shape around the primary bar St, a heat-shrinkable resin (polymer) tube may be disposed around the primary bar St and then heat may be applied thereto, etc.

In addition or in the alternative to PP, the thermoplastic polymer (resin) material of the above-described embodiments may be or include, e.g., polyethylene, nylon, polyester, or the like. In addition or in the alternative to basalt fibers, the reinforcing fibers may be or include another type of inorganic fiber, such as, e.g., glass fiber or carbon fiber, and/or may be an organic fiber such as aramid fiber or acrylic fiber.

Figure 14:
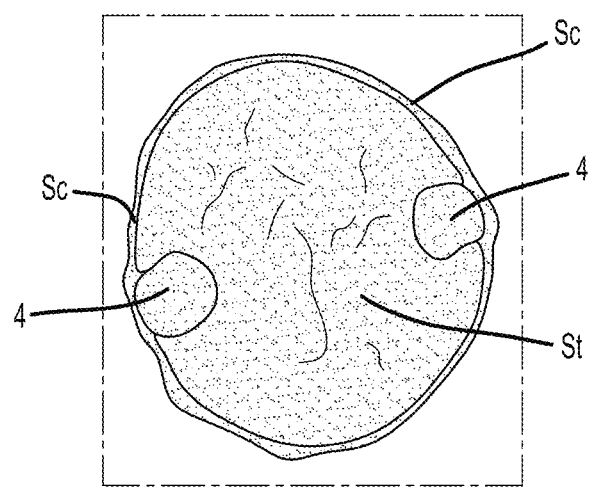
FIG. 14 is a cross-sectional view of a reinforcing bar according to another embodiment.

Prior to forming the covering layer Sy on the outer periphery of the primary bar St, thread-like bodies 4 such as cotton threads, which are superior in tensile strength, may be integrally fused to radially symmetrical positions on (along) the outer periphery of the primary bar St respectively, as shown in transverse cross section in FIG. 14. In other words, the thread-like bodies 4 are provided (attached, fused) along the outer periphery, in the longitudinal direction, of the primary bar St while still at a high temperature and in a molten state having just been pulled out from the mold 25 (FIG. 5), to advantageously fuse and integrate the thread-like bodies 4 into the primary bar St. Thereafter, the primary bar St integrated with the thread-like bodies 4 is covered by the covering layer Sy and cooled to obtain the reinforcing bar Sc. Such a reinforcing bar Sc has further sufficiently increased tensile strength.

As the thread-like body 4, in addition or in the alternative to a cotton thread, it is possible to use a vinylon thread, a nylon thread, a PP thread, a nylon gut (nylon string), a nylon rope or the like. Note that the elongated body is not necessarily limited to the thread-like body, and any elongated body superior in tensile strength extending in the longitudinal direction of the primary bar may be used. In addition, the elongated body is not required to be provided in pairs at radially symmetrical positions on the outer periphery of the primary bar, and may also be provided at one position or at three or more positions on (along) the outer periphery, and mounting (arrangement) intervals thereof are not required to be radially equal intervals.

As the elongated body, a metallic bar or a metallic strip of copper or the like, which is superior in electric conductivity, may be used in addition to or instead of the above-mentioned thread-like bodies.

A coupling tool for joining (coupling, connecting) another primary bar of a certain length with the covering layer being formed may be fused to an outer periphery of an end portion of the primary bar of a certain length with the covering layer being formed. The coupling tool preferably has a tubular portion to be put on (around) the outer periphery of the covering layer and is fused to the covering layer in a molten state, and more preferably has a threaded portion being formed on an inner periphery of the tubular portion.

In the above-described embodiments, formation of the covering layer is not necessarily essential, and the primary bar may be a reinforcing bar as the end product.

Additional teachings that may be advantageously utilized together with the teachings of the present application, such as compositions, sizes, arrangements, etc. of suitable thermoplastic polymers, reinforcing fibers, etc., are disclosed in U.S. patent application Ser. Nos. 17/464,996, 17/530,519 and 17/645,651, the contents of all of which are fully incorporated herein by reference.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved apparatuses for molding a reinforcing bar and methods of using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A method for producing a reinforcing bar, comprising:
    immersing and passing reinforcing fibers in a non-flat bundle form through a storage tank containing a molten thermoplastic polymer;
    while still immersed in the storage tank, spreading the reinforcing fibers such that the reinforcing fibers are arrayed in flatter state to cause the molten thermoplastic polymer to further impregnate between, and coat, the reinforcing fibers;
    converging the flattened reinforcing fibers impregnated with the molten thermoplastic polymer into a non-flat bundle form again to form a not yet cooled primary bar; and
    covering an entire outer periphery and longitudinal length of the not yet cooled primary bar with a covering layer made of an additional thermoplastic polymer to form the reinforcing bar by applying a predetermined squeezing force to the covering layer such that an inner periphery of the covering layer fuses with the outer periphery of the not yet cooled primary bar and causes an overall transverse cross section of the reinforcing bar to become more circular.

2. The method according to claim 1, wherein the spreading comprises pulling the reinforcing fibers under tension across surfaces of a plurality of rods that extend perpendicular to the reinforcing fibers in the storage tank.

3. The method according to claim 1, wherein the covering layer is a solid film material that has the same chemical composition as the molten thermoplastic polymer in the storage tank.

4. The method according to claim 1, wherein the covering layer is a solid film material that has a different chemical composition from the molten thermoplastic polymer in the storage tank.

5. The method according to claim 1, further comprising:
    prior to the covering, integrally fusing an elongated body along a longitudinal direction of the outer periphery of the not yet cooled primary bar;
    wherein the elongated body has a higher tensile strength than the reinforcing fibers.

6. The method according to claim 5, wherein the elongated body is a thread, a string or a rope.

7. The method according to claim 6, wherein the thread, the string or the rope comprises cotton, vinylon, nylon or polypropylene.

8. The method according to claim 1, further comprising:
fusing a coupling tool to an end portion of the primary bar.

9. The method according to claim 1, wherein:
the molten thermoplastic polymer in the storage tank is one or more of polypropylene, polyethylene, nylon and/or polyester, and
the reinforcing fibers are one or more of basalt fibers, glass fibers, carbon fibers, aramid fibers and/or acrylic fibers.

10. The method according to claim 1, wherein:
the molten thermoplastic polymer in the storage tank comprises at least a majority of polypropylene, and
the reinforcing fibers comprise at least a majority of basalt fibers.

11. The method according to claim 1, wherein the covering layer is a solid film material made of the additional thermoplastic polymer that is applied with the predetermined fastening force.

12. The method according to claim 11, wherein the covering is performed while the temperature(s) of the reinforcing fibers impregnated with the molten thermoplastic polymer is (are) higher than the melting point of the additional thermoplastic polymer of the solid film material, whereby the solid film material at least partially melts and fuses with the thermoplastic polymer impregnated in the reinforcing fibers.

13. The method according to claim 12, wherein:
the molten thermoplastic polymer in the storage tank is one or more of polypropylene, polyethylene, nylon and/or polyester, and
the reinforcing fibers are one or more of basalt fibers, glass fibers, carbon fibers, aramid fibers and/or acrylic fibers.

14. The method according to claim 13, wherein:
the molten thermoplastic polymer in the storage tank comprises at least a majority of polypropylene, and
the reinforcing fibers comprise at least a majority of basalt fibers.

15. The method according to claim 14, further comprising:
prior to the covering, integrally fusing at least one thread, string or rope along a longitudinal direction of an outer periphery of the converged reinforcing fibers impregnated with the thermoplastic polymer;
wherein the thread, string or rope has a higher tensile strength than the reinforcing fibers; and
the thread, string or rope comprises cotton, vinylon, nylon or polypropylene.

16. The method according to claim 15, further comprising:
fusing a coupling tool to an end portion of the primary bar.

* * * * *